(12) United States Patent
Matsunaga et al.

(10) Patent No.: US 9,885,308 B2
(45) Date of Patent: Feb. 6, 2018

(54) CONTROL APPARATUS OF ENGINE

(71) Applicant: MITSUBISHI JIDOSHA KOGYO KABUSHIKI KAISHA, Tokyo (JP)

(72) Inventors: Ayatoshi Matsunaga, Aichi (JP); Yasuo Yamaguchi, Aichi (JP); Shinichi Murata, Aichi (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 218 days.

(21) Appl. No.: 14/981,398

(22) Filed: Dec. 28, 2015

(65) Prior Publication Data

US 2016/0108845 A1 Apr. 21, 2016

Related U.S. Application Data

(63) Continuation of application No. PCT/JP2014/065707, filed on Jun. 13, 2014.

(30) Foreign Application Priority Data

Jun. 27, 2013 (JP) .................................. 2013-135553

(51) Int. Cl.
    *F02D 41/30*    (2006.01)
    *F02B 37/18*    (2006.01)
    *F02D 41/00*    (2006.01)
    *F02B 33/40*    (2006.01)
    *F02B 39/08*    (2006.01)
    *F02D 41/34*    (2006.01)
(Continued)

(52) U.S. Cl.
CPC .......... *F02D 41/3005* (2013.01); *F02B 33/40* (2013.01); *F02B 37/18* (2013.01); *F02B 37/183* (2013.01); *F02B 39/08* (2013.01); *F02D 41/0007* (2013.01); *F02D 41/3094* (2013.01); *F02D 41/3836* (2013.01); *F01N 3/101* (2013.01); *F02D 41/34* (2013.01); *F02D 2041/389* (2013.01); *F02M 69/046* (2013.01); *Y02T 10/144* (2013.01); *Y02T 10/22* (2013.01)

(58) Field of Classification Search
CPC ...... F02B 37/18; F02B 37/183; F02B 37/186; F02D 41/3094; F02D 2041/389
See application file for complete search history.

(56) References Cited

FOREIGN PATENT DOCUMENTS

JP     60-173315 A     9/1985
JP       4-54222 A     2/1992
(Continued)

OTHER PUBLICATIONS

Extended European Search Report dated Mar. 13, 2017 in corresponding European Patent Application No. 14817149.9.

*Primary Examiner* — Jonathan Matthias
(74) *Attorney, Agent, or Firm* — Birch, Stewart, Kolasch & Birch, LLP

(57) ABSTRACT

In a control apparatus of an engine having a first fuel injection valve for injecting fuel into an intake path of the engine, a second fuel injection valve for injecting fuel into a combustion chamber of the engine, a supercharger for supercharging intake air for the engine, and a waste gate valve for opening and closing an exhaust bypass passage for bypassing a turbine of the supercharger, the waste gate valve is controlled to act in a closing direction in response to an increase in the injection amount of fuel injected from the first fuel injection valve, in a region where the injection amount of fuel from the first fuel injection valve is larger than the injection amount of fuel from the second fuel injection valve.

8 Claims, 7 Drawing Sheets

(51) Int. Cl.
  *F02D 41/38* (2006.01)
  *F01N 3/10* (2006.01)
  *F02M 69/04* (2006.01)

(56) References Cited

FOREIGN PATENT DOCUMENTS

| | | |
|---|---|---|
| JP | 11-351010 A | 12/1999 |
| JP | 11-351041 A | 12/1999 |
| JP | 2003-83138 A | 3/2003 |
| JP | 2005-214063 A | 8/2005 |
| JP | 2005-307756 A | 11/2005 |
| JP | 2005-330943 A | 12/2005 |
| JP | 2012-163026 A | 8/2012 |
| WO | WO 2006/095515 A1 | 9/2006 |

CONTROL APPARATUS OF ENGINE

This application is a Continuation of PCT International Application No. PCT/JP2014/065707, filed on Jun. 13, 2014, which claims priority under 35 U.S.C. 119(a) to Patent Application No. 2013-135553, filed in Japan on Jun. 27, 2013, all of which are hereby expressly incorporated by reference into the present application.

TECHNICAL FIELD

This invention relates to a control apparatus of an engine equipped with a waste gate valve for adjusting a boost pressure by a turbocharger.

BACKGROUND ART

An engine equipped with a turbocharger (supercharger) drives an exhaust turbine by an exhaust gas flowing through an exhaust passage, supercharges air by a compressor coupled to the exhaust turbine to increase the output of the engine, and is generally equipped with a waste gate valve for adjusting the boost pressure of the turbocharger. Upon opening/closing of the waste gate valve, the following advantages, for example, are obtained: An excessive rise in the boost pressure is suppressed, whereby stability of the boost pressure can be ensured, and damage to the engine or the turbocharger itself can be inhibited. In recent years, it has been common practice to actively control the opening/closing action of the waste gate valve in accordance with the operating state of the engine. There has been, for example, a turbocharger-equipped engine having a first fuel injection valve for injecting fuel to an intake path (intake port) (i.e., port injection valve), and a second fuel injection valve for injecting fuel into a combustion chamber (i.e., cylinder injection valve), wherein in accordance with the operating state of the engine, the cylinder injection valve and the port injection valve are controlled, and a waste gate valve (exhaust bypass valve) is also opened and closed as appropriate (see, for example, Patent Document 1).

This Patent Document 1 discloses a technology which opens the exhaust bypass valve as well as an intake bypass valve, for example, when shifting from a homogeneous lean operation concurrently using supercharging to stratified combustion involving no supercharging.

PRIOR ART DOCUMENTS

Patent Documents

Patent Document 1: JP-A-2005-214063

SUMMARY OF THE INVENTION

Problems to be Solved by the Invention

Assume that in a situation where the operating state of the engine is, for example, in a low load operating range with a small amount of air or a small flow rate of air, fuel is directly injected from the second fuel injection valve into the combustion chamber. In this case, fuel and intake air are mixed insufficiently. Thus, combustion efficiency decreases, with the result that fuel economy may deteriorate or the exhaust gas may be adversely affected. Moreover, fuel deposits on the top surface of the piston and the inner wall of the cylinder, thus potentially posing problems such as dilution of an engine oil (oil dilution) or formation of carbon.

With the above-mentioned turbocharger-equipped engine having the first fuel injection valve (port injection valve) and the second fuel injection valve (cylinder injection valve), therefore, it is attempted to improve combustion stability or the like by changing the injection amounts or the injection ratios of the first and second fuel injection valves in accordance with the operating state of the engine.

The combustion stability or the like of the engine can be improved by changing, as appropriate, the injection amounts or the injection ratios of the first and second fuel injection valves in accordance with the operating state of the engine. However, the improvement is not sufficient, and a further improvement is desired.

The present invention has been accomplished in the light of the above circumstances. It is an object of the invention to provide a control apparatus of an engine which can enhance combustion stability and also improve fuel economy.

Means for Solving the Problems

A first aspect of the present invention, for solving the above problems, is a control apparatus of an engine having a first fuel injection valve for injecting fuel into an intake path of the engine, a second fuel injection valve for injecting fuel into a combustion chamber of the engine, a supercharger for supercharging intake air for the engine, and a waste gate valve for opening and closing an exhaust bypass passage for bypassing a turbine of the supercharger, the control apparatus comprising: fuel injection control device that controls the injection amounts of fuel injected from the first fuel injection valve and the second fuel injection valve in accordance with the operating state of the engine; and valve control device that controls the opening/closing action of the waste gate valve, wherein the valve control device controls the waste gate valve to act in a closing direction in response to an increase in the injection amount from the first fuel injection valve, in a region where the injection amount from the first fuel injection valve is larger than the injection amount from the second fuel injection valve.

A second aspect of the present invention is the control apparatus of an engine according to the first aspect, wherein the valve control device sets the waste gate valve in an open state, in a low rotation, low load operating range.

A third aspect of the present invention is the control apparatus of an engine according to the second aspect, wherein the valve control device decreases the opening of the waste gate valve from the open state as the injection amount of fuel injected from the first fuel injection valve increases, in the low rotation, low load operating range.

A fourth aspect of the present invention is the control apparatus of an engine according to the third aspect, wherein the fuel injection control device changes the injection ratios of fuel injected from the first fuel injection valve and the second fuel injection valve in accordance with the operating state of the engine; and when the operating range is switched to an operating range where the injection ratio of the second fuel injection valve is changed so as to become higher than the injection ratio of the first fuel injection valve, the valve control device closes the waste gate valve before switching of the operating range.

A fifth aspect of the present invention is the control apparatus of an engine according to any one of the first to fourth aspects, wherein the fuel injection control device injects fuel only from the first fuel injection valve in the low rotation, low load operating range.

Effects of the Invention

With the present invention described above, combustion stability can be enhanced, and fuel economy can be improved. That is, when the injection amount of the second fuel injection valve is small, the waste gate valve is controlled to act in the opening direction, whereby turbine drive load can be reduced to decrease fuel consumption. When the injection amount of the second fuel injection valve is increased, on the other hand, the waste gate valve is controlled to act in the closing direction, whereby the supercharging effect of the turbocharger can be enhanced. Accordingly, the amount of air (the amount of flow) within the cylinder also increases, resulting in satisfactory mixing of fuel and intake air. Thus, deposition of fuel on the top surface of the piston or the inner wall of the cylinder can be suppressed.

MODE FOR CARRYING OUT THE INVENTION

An embodiment of the present invention will now be described in detail by reference to the accompanying drawings.

Figure 1:
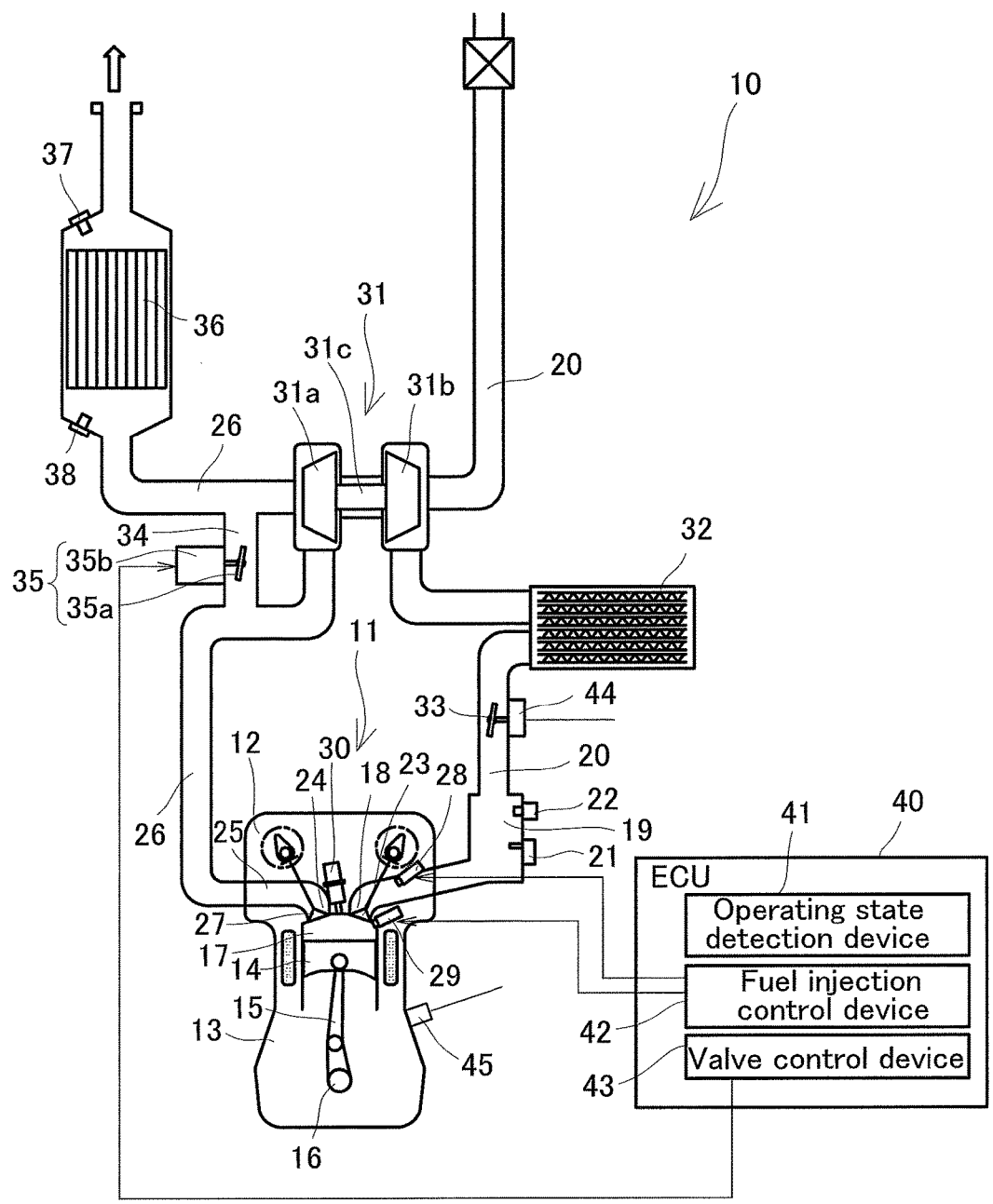
FIG. 1 is a schematic view of an engine equipped with a control apparatus according to an embodiment of the present invention.

First of all, an explanation will be offered for the entire configuration of an engine 10 according to the embodiment of the present invention. As shown in FIG. 1, an engine body 11 constituting the engine 10 has a cylinder head 12 and a cylinder block 13, and a piston 14 is accommodated within the cylinder block 13. The piston 14 is connected to a crankshaft 16 via a connecting rod 15. The piston 14, the cylinder head 12, and the cylinder block 13 form a combustion chamber 17.

An intake port 18 is formed in the cylinder head 12, and an intake pipe (intake path) 20 including an intake manifold 19 is connected to the intake port 18. The intake manifold 19 is provided with an intake pressure sensor (MAP sensor) 21 for detecting an intake pressure, and an intake temperature sensor 22 for detecting the temperature of intake air. An intake valve 23 is also provided inside the intake port 18, and the intake port 18 is opened and closed with the intake valve 23. Further, an exhaust port 24 is formed in the cylinder head 12, and an exhaust pipe (exhaust path) 26 including an exhaust manifold 25 is connected to the interior of the exhaust port 24. An exhaust valve 27 is provided in the exhaust port 24, and the exhaust port 24 is opened and closed with the exhaust valve 27, as is the intake port 18.

Moreover, the engine body 11 is provided with a first fuel injection valve (intake path injection valve) 28 for injecting fuel into the intake pipe (intake path) 20, for example, near the intake port, and is also provided with a second fuel injection valve (cylinder injection valve) 29 for directly injecting fuel into the combustion chamber 17 of each cylinder. The first fuel injection valve 28 is supplied with fuel from a low pressure supply pump installed within a fuel tank (not shown) via a low pressure delivery pipe, while the second fuel injection valve 29 is supplied with fuel from a high pressure supply pump, which further pressurizes the fuel supplied from the low pressure supply pump, via a high pressure delivery pipe, although these configurations are not shown. The high pressure delivery pipe is supplied with fuel, which has been supplied from the low pressure supply pump, while being pressurized to a predetermined pressure by the high pressure supply pump. The cylinder head 12 is further mounted with a spark plug 30 for each cylinder.

A turbocharger (supercharger) 31 is provided halfway between the intake pipe 20 and the exhaust pipe 26. The turbocharger 31 has a turbine 31a and a compressor 31b, and the turbine 31a and the compressor 31b are coupled together by a turbine shaft 31c. When an exhaust gas flows into the turbocharger 31, the turbine 31a is rotated by the flow of the exhaust gas and, in accordance with the rotation of the turbine 31a, the compressor 31b is rotated. Air (intake air) pressurized by the rotations of the compressor 31b is sent out into the intake pipe 20, and supplied to each intake port 18.

An intercooler 32 is provided at a portion of the intake pipe 20 downstream of the compressor 31b, and a throttle valve 33 is provided downstream of the intercooler 32. An upstream side and a downstream side of the exhaust pipe 26, with the turbocharger 31 being interposed therebetween, are connected together by an exhaust bypass passage 34. That is, the exhaust bypass passage 34 is a passage for bypassing the turbine 31a of the turbocharger 31. A waste gate valve 35 is provided in the exhaust bypass passage 34. The waste gate valve 35 is equipped with a valve body 35a, and an electrically operated actuator (electric motor) 35b for driving the valve body 35a, and the amount of the exhaust gas flowing through the exhaust bypass passage 34 can be adjusted depending on the opening of the valve body 35a. That is, the waste gate valve 35 is configured to be capable of controlling the boost pressure of the turbocharger 31 by adjustment of its opening.

A three-way catalyst 36, an exhaust gas purification catalyst, is interposed in a portion of the exhaust pipe 26 on the downstream side of the turbocharger 31. An $O_2$ sensor 37 for detecting the $O_2$ concentration of the exhaust gas after passage through the catalyst is provided on the outlet side of the three-way catalyst 36. A linear air-fuel ratio sensor (LAFS) 38 for detecting the air-fuel ratio of the exhaust gas (exhaust air-fuel ratio) before passage through the catalyst is provided on the inlet side of the three-way catalyst 36.

The engine 10 is also equipped with an electronic control unit (ECU) 40, and the ECU 40 is equipped with input/output devices, storage devices for storage of control programs and control maps, a central processing unit, and timers and counters. The ECU 40 exercises the integrated control of the engine 10 based on information from the various sensors. The control apparatus of an engine according to the present embodiment is composed of such an ECU 40, and controls the opening/closing action of the waste gate valve 35 as will be described below.

The following is an explanation for control over the opening/closing action of the waste gate valve by the control apparatus of an engine according to the present embodiment.

Figure 2:
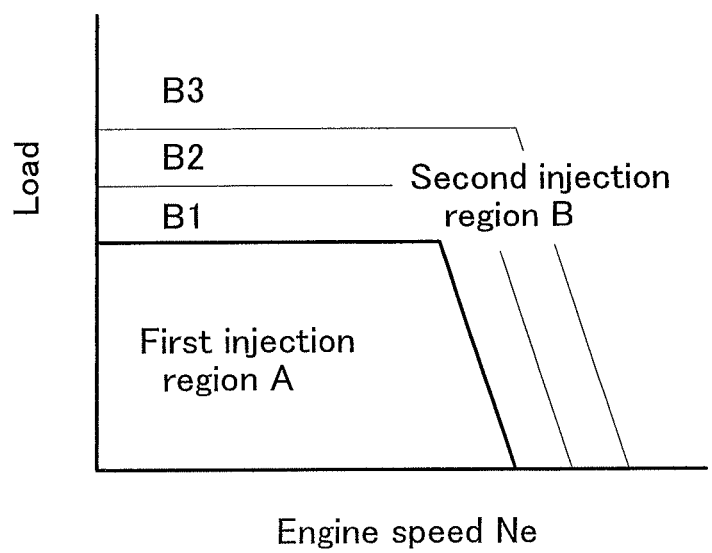
FIG. 2 is an example of a map specifying fuel injection control according to the embodiment of the present invention.

The ECU 40 is equipped with an operating state detection device 41, a fuel injection control device 42, and a valve control device 43. The operating state detection device 41 detects the operating state of the engine 10, for example, based on information from the various sensors such as a throttle position sensor 44 and a crank angle sensor 45. The fuel injection control device 42 controls, as appropriate, the injection amounts of fuel injected from the first fuel injection valve 28 and the second fuel injection valve 29 in accordance with the operating state of the engine 10, namely, in accordance with the detection results of the operating state detection device 41. In the present embodiment, the fuel injection control device 42 controls, as appropriate, the injection amounts of fuel injected from the first fuel injection valve 28 and the second fuel injection valve 29, and also changes, as appropriate, the injection ratios of fuel injected from the first fuel injection valve 28 and the second fuel injection valve 29. Concretely, the fuel injection control device 42 refers to an operating range map as shown in FIG. 2, and determines the relative injection ratio between the first fuel injection valve 28 and the second fuel injection valve 29, and the respective injection amounts of the valves 28 and 29, depending on which of the operating ranges the current operating state of the engine 10 is in.

In the present embodiment, the fuel injection control device 42 exercises control for injecting fuel only from the first fuel injection valve 28 (hereinafter referred to as "MPI injection control"), and control for injecting fuel from each of the first and second fuel injection valves 28 and 29 at a predetermined injection ratio (hereinafter referred to as "MPI+DI injection control"), in accordance with the operating state of the engine 10. As shown in FIG. 2, for example, the operating ranges are set based on the speed Ne and load of the engine 10. In the present embodiment, two regions are set, a first injection region A which is the operating range on a low rotation, low load side, and a second injection region B which is the operating range on a high rotation, high load side.

If the operating state of the engine 10 is in the first injection region A which is the low rotation, low load region, the fuel injection control device 42 performs "MPI injection control" so that the injection amount from the first fuel injection valve 28 increases as the speed and load of the engine 10 increase. This is because in the low rotation, low load region, the amount of intake air is small and the flow velocity of air is low, so that fuel injected from the second fuel injection valve 29 mixes insufficiently within the combustion chamber 17. Thus, a large amount of unburned fuel is incorporated in the exhaust gas after combustion, eventually exerting adverse influence on the environment. Moreover, fuel directly injected into the combustion chamber 17 is apt to deposit as fuel droplets on the top surface of the piston 14 or on the inner wall of the cylinder, causing oil dilution or carbon formation.

If the operating state of the engine 10 is in the second injection region B, on the other hand, the fuel injection control device 42 performs "MPI+DI injection control". This is because as the injection amount from the second fuel injection valve 29 increases, the temperature inside the combustion chamber 17 lowers owing to the heat of vaporization of fuel injected from the second fuel injection valve 29, and raises the combustion efficiency. Within the second injection region B, moreover, a plurality of regions (e.g., B1 to B3) are set, starting from the low rotation, low load side. The fuel injection control device 42 appropriately controls the first and second fuel injection valves 28 and 29 in such a manner that the higher rotation, higher load region the operating state of the engine 10 resides in, the higher the injection amount or the injection ratio of the second fuel injection valve 29 becomes. That is, in the example of the map shown in FIG. 2, when the operating state of the engine 10 is in the region B3, the fuel injection control device 42 controls, as appropriate, the first and second fuel injection valves 28 and 29 such that the injection amount or the injection ratio of the second fuel injection valve 29 is the highest. Within each of the regions B1, B2 and B3 of the second injection region B, the injection amounts or the injection ratios of the first and second fuel injection valve 28 and 29 may be constant, or may be such that the injection amount or the injection ratio of the second fuel injection valve 29 is increased on the higher rotation, higher load side.

Figure 3:
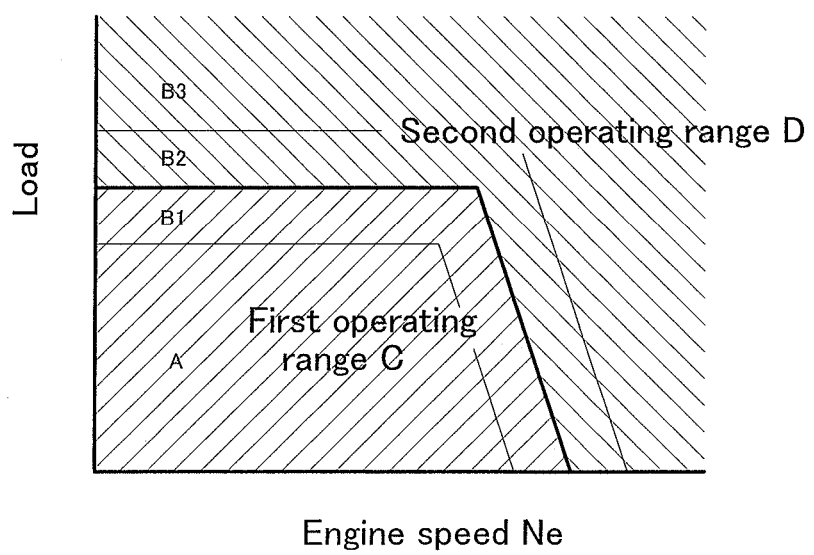
FIG. 3 is an example of a map specifying opening/closing control over a waste gate valve according to the embodiment of the present invention.

An operating range map for determining the opening of the waste gate valve 35 is set based on the operating range map for determining the injection amount or injection ratio (FIG. 2). As FIG. 3 shows an example, for instance, two ranges are set, a first operating range C on a low rotation, low load side, and a second operating range D on a high rotation, high load side. The first operating range C is an operating range in which the injection ratio of the second fuel injection valve 29 is low and, in the present embodiment, includes the above-mentioned first injection region A and a part of the above second injection region B (e.g., region B1). The second operating range D is an operating range in which the injection ratio of the second fuel injection valve 29 is high and, in the present embodiment, corresponds to a part of the second injection region B (regions B2, B3).

The valve control device 43 refers to such an operating range map (FIG. 3) and, when the operating state of the engine 10 is in the first operating range C based on the detection results of the operating state detection device 41, brings the waste gate valve 35 to an open state. In the first operating range C, if the exhaust passes through the turbine 31b in a large amount, it presents exhaust resistance, so that the exhaust resistance is decreased by bypassing the turbine 31b. The open state does not necessarily mean only a state where the waste gate valve 37 is fully open, but may include a state in which the waste gate valve 37 is somewhat closed. In other words, the open state refers to a state in which the opening of the waste gate valve 35 (for example, a valve opening height) is relatively great and, for example, refers to a state in which the opening range is equal to or more than 50% relative to an opening corresponding to full openness. The full openness represents the maximum value of the set range of openings of the waste gate valve 35. Assume, for example, that when the opening is expressed as the opening valve height, the waste gate valve 35 can be used physically at an opening height of 0 to 10 mm. Even in this case, if the set range for the opening valve height in actual use is 0 to 8 mm, the full openness represents the position at 8 mm.

If the operating state of the engine 10 is judged to have shifted from the first operating range C to the second operating range D, the valve control device 43 controls the waste gate valve 35 so as to be brought from an open state toward a closing direction. That is, the valve control device 43 controls the opening of the waste gate valve 35 so as to be reduced to a predetermined opening.

If the operating state of the engine 10 is judged to have shifted from the second operating range D to the first operating range C, on the other hand, the waste gate valve 35 is controlled to be pointed in an opening direction. That is, the valve control device 43 controls the opening of the waste gate valve 35 so as to grow to a predetermined opening. In the first operating range C, the opening of the waste gate valve 35 may be constant, but in the low rotation, low load region of the first operating range C, the state of the waste gate valve 35 is preferably rendered open, especially, fully open. By so doing, the exhaust turbine can be prevented from presenting exhaust resistance to raise the exhaust pressure and increase a pumping loss.

Next, an example of control over the opening/closing action of the waste gate valve will be described by reference to a flow chart in FIG. 4.

Figure 4:
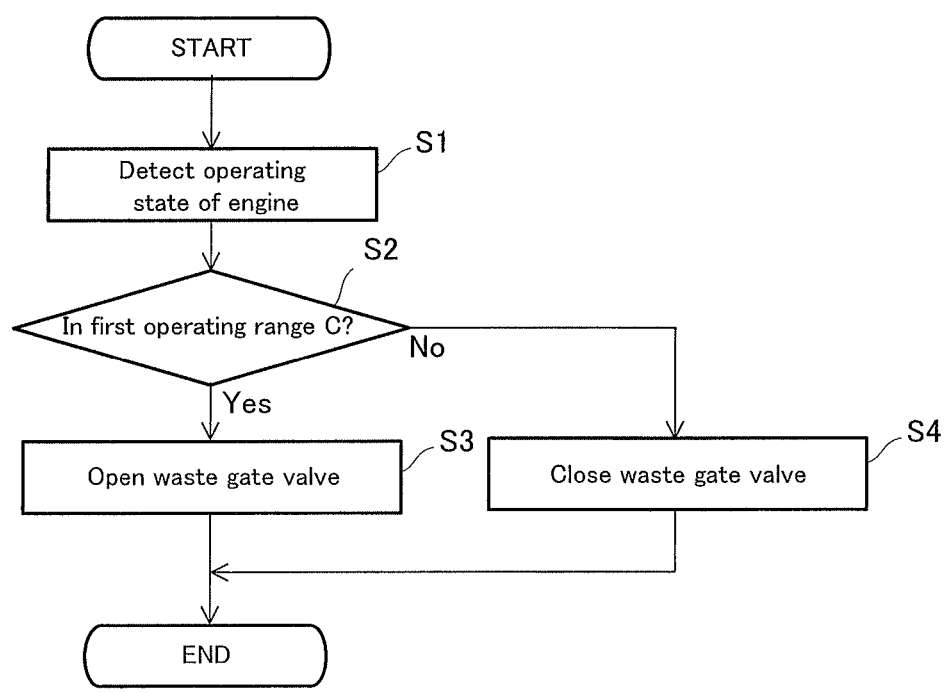
FIG. 4 is a flow chart showing a method of controlling the waste gate valve according to the embodiment of the present invention.

As shown in FIG. 4, the operating state of the engine 10 is detected in Step S1. Concretely, the operating state of the engine 10 is detected, for example, based on information from the various sensors such as the throttle position sensor 44 and the crank angle sensor 45. That is, the speed and load of the engine 10 are detected. Then, in Step S2, it is determined whether the operating state of the engine 10 is in the first operating range C. If it is determined that the operating state of the engine 10 is in the first operating range C, the program proceeds to Step S3, in which the waste gate valve 35 is controlled to an opening direction. If the opening of the waste gate valve 35 has already increased to a predetermined opening, this opening is retained. If it is determined that the operating state of the engine 10 is not in the first operating range C, that is, it is in the second operating range D, the program proceeds to Step S4, in which the waste gate valve 35 is controlled to a closing direction. If, in this case as well, the opening of the waste gate valve 35 has already decreased to a predetermined opening, this opening is retained.

As noted above, the valve control device 43 controls the opening of the waste gate valve 35 in accordance with the injection amount from or the injection ratio of the first fuel injection valve 28. This measure makes it possible to increase the boost pressure before the injection amount from the second fuel injection valve 29 is increased. In increasing the injection amount from the second fuel injection valve 29, therefore, fluidity of air within the combustion chamber 17 can be accelerated, and mixing of fuel directly injected into the combustion chamber 17 can be promoted to improve combustion stability. Moreover, the interior of the combustion chamber 17 can be cooled by the heat of vaporization of fuel directly injected into the combustion chamber 17. Thus, knocking attributed to the elevation of boost pressure can be suppressed to raise the combustion efficiency and improve fuel economy. If the injection amount or injection ratio of the second fuel injection valve 29 is low, for example, the waste gate valve 35 is controlled to be pointed in the opening direction, whereby the turbine drive load of the turbocharger 31 can be decreased to reduce fuel consumption. Furthermore, the waste gate valve 35 is set in the open state only in the low rotation, low load region of the first operating range C, so that fuel economy can be improved.

In the operating range where the injection amount or injection ratio of the second fuel injection valve 29 is high, on the other hand, the waste gate valve 35 is controlled to be pointed in the closing direction. Thus, the supercharging effect of the turbocharger 31 is enhanced and, accordingly, the amount of air (amount of flow) in the cylinder is also increased. Hence, fuel and intake air are mixed satisfactorily, and the deposition of fuel on the top surface of the piston or the inner wall of the cylinder is also suppressed. Besides, the increase in the injection ratio of the second fuel injection valve 29 can enhance an intake air cooling effect in the cylinder, resulting in an increased combustion efficiency.

In the present embodiment, depending on whether the operating state of the engine 10 is in the first operating range C or in the second operating range D (see FIG. 3), the waste gate valve 35 is controlled to the same opening in each operating range. In the first operating range C, for example, the waste gate valve 35 is set in an open state (at an opening of at least 50% relative to the full opening) in the low rotation, low load region, but basically, the waste gate valve 35 is controlled to the same opening. Within the same operating range, however, the opening (valve opening height) of the waste gate valve 35 may be changed gradually (progressively) depending on the operating state of the engine 10.

Figure 5:
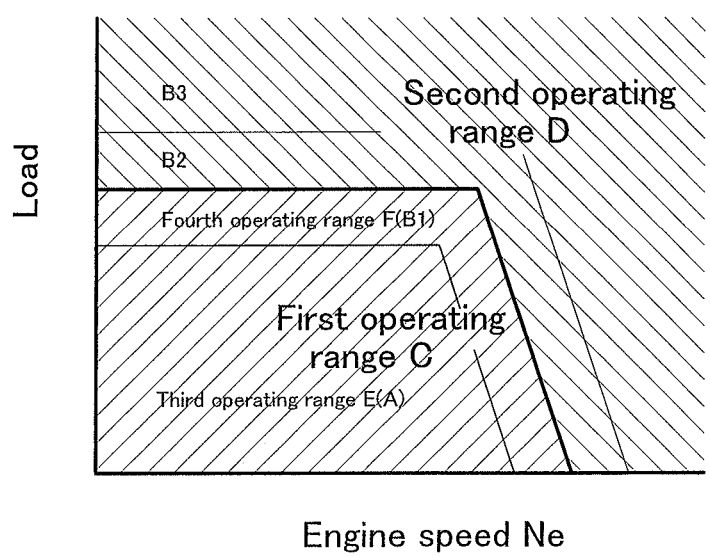
FIG. 5 is an exemplary map specifying opening/closing control over the waste gate valve according to the embodiment of the present invention.

As shown in FIG. 5, for example, a first operating range C includes a third operating range E (first injection region A) in which fuel is injected only from the first fuel injection valve 28, and a fourth operating range F (second injection region B1) in which fuel is injected from the first fuel injection valve 28 and the second fuel injection valve 29. That is, in the fourth operating range F, "MPI+DI injection control" is executed. When, in the fourth operating range F, the fuel injection control device 42 increases the injection amount or injection ratio of the second fuel injection valve 29 as the load and engine speed approach those in the second operating range. D, the valve control device 43 may gradually decrease the opening of the waste gate valve 35 as the injection amount or injection ratio of the second fuel injection valve 29 increases.

In the fourth operating range F, the injection amount from the first fuel injection valve 28 also increases as the load and engine speed approach those in the second operating range D. The valve control device 43, therefore, may control the waste gate valve 35 to act in a closing direction as the injection amount from the first fuel injection valve 28 increases. Assume, for example, that the fuel injection control device 42 gradually increases the injection amount of fuel from the second fuel injection valve 29, with the injection ratio of the second fuel injection valve 29 being constant, in the fourth operating range F, namely, that the fuel injection amount of the first fuel injection valve 28 is increased in addition to the fuel injection amount of the second fuel injection valve 29. In this case, the valve control device 43 may gradually decrease the opening of the waste gate valve 35 as the injection amount of fuel from the second fuel injection valve 29 increases.

By so controlling the opening of the waste gate valve 35, too, the opening of the waste gate valve 35 can be controlled to a state more suitable for the operating state of the engine 10. When the third operating range E and the fourth operating range F are included in the first operating range C, as above, it is preferred to open the waste gate valve 35 fully in the low rotation, low load region of the first operating range C. In the present embodiment, for example, it is preferred that the waste gate valve 35 be rendered substantially fully open in the third operating range E which is the low rotation, low load region.

The valve control device 43, as described above, adjusts the opening of the waste gate valve 35 in response to the injection amount or injection ratio of the first fuel injection valve 28 or the second fuel injection valve 29, thereby controlling the boost pressure of the turbocharger 31. As mentioned earlier, the valve control device 43, in the fourth operating range F, controls the waste gate valve 35 from the open state into the closing direction if the injection amount from the first fuel injection valve 28 increases, and controls the waste gate valve 35 to act in the opening direction if the injection amount decreases. In the second operating range D, the valve control device 43 controls the waste gate valve 35 to act in the closing direction if the injection amount or injection ratio of the second fuel injection valve 29 increases, but controls the waste gate valve 35 to act in the opening direction if the injection amount or injection ratio of the second fuel injection valve 29 decreases. The injection amounts or injection ratios of the first fuel injection valve 28 and the second fuel injection valve 29 are determined based on the operating range map (see FIG. 2), and the opening of the waste gate valve 35 is similarly determined based on the predetermined operating range map (see FIG. 5).

In the present embodiment, the waste gate valve 35 is controlled to the closing direction beyond the boundary between the fourth operating range F and the second operating range D. However, the waste gate valve 35 may be fully closed up to the boundary between the fourth operating range F and the second operating range D.

By so doing, the opening of the waste gate valve 35 is controlled to a state more suitable for the operating state of the engine 10. Thus, the engine 10 can be operated with high efficiency.

Figure 6:
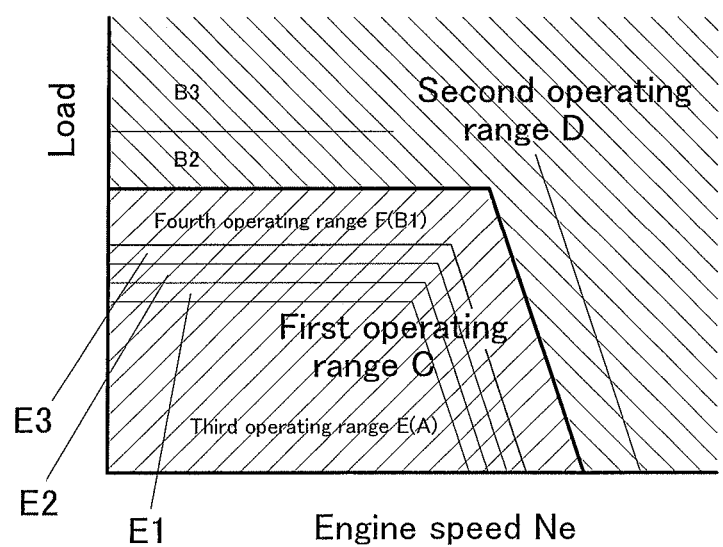
FIG. 6 is another exemplary map specifying opening/closing control over the waste gate valve according to the embodiment of the present invention.

Further, the valve control device 43 may gradually decrease the opening of the waste gate valve 35 in the third operating range E (first injection region A) as the load and engine speed approach those in the fourth operating range F (second injection region B). As shown in FIG. 6, for example, it is permissible to set a plurality of regions E1 to E3 near the boundary of the third operating range E with the fourth operating range F, and to decrease the opening of the waste gate valve 35 progressively in the regions E1 to E3. In the aforementioned third operating range E, which is the low rotation low load region, of the first operating range C, for example, the waste gate valve 35 is basically fully open. In the regions E1, E2, E3 near the border of the third operating range E with the fourth operating range F, however, it is preferred to control the waste gate valve 35 toward the closing direction in accordance with the increase in the injection amount from the first fuel injection valve 28. Within each of the regions E1 to E3, it goes without saying that the opening of the waste gate valve 35 may be gradually decreased.

According to the above procedures, the opening of the waste gate valve 35 can be controlled to a state further suitable for the operating state of the engine 10.

Figure 7:
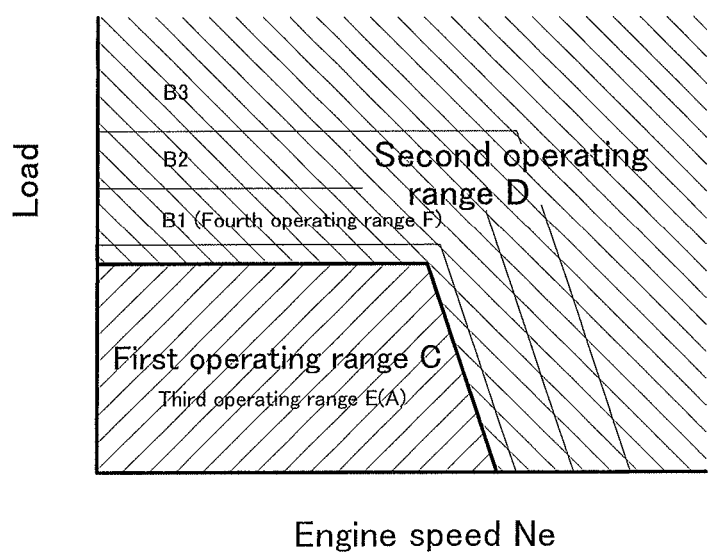
FIG. 7 is still another exemplary map specifying opening/closing control over the waste gate valve according to the embodiment of the present invention.

The above example, moreover, illustrates the map including the third operating range E and the fourth operating range F in the first operating range C. However, as shown in FIG. 7, for example, the first operating range C may include only the third operating range E. In this case, it is preferred for the valve control device 43 to start controlling the waste gate valve 35, which is opened in the third operating range E, so as to act in the closing direction before switching to the fourth operating range F. That is, in the above-mentioned example, the boundary between the first operating range C and the second operating range D is situated within the second injection region B where "MPI+DI injection control" is performed. However, the boundary between the first operating range C and the second operating range D may be situated within the first injection region A where "MPI injection control" is performed. By so doing, at a time when the engine speed and load reach the fourth operating range F, the waste gate valve 35 can be set at the optimum opening for the fourth operating range F. Thus, the operating mode can be switched without a sense of incongruity, and the engine 10 can be operated efficiently.

The present invention has been described with reference to the foregoing embodiment, but it goes without saying that the present invention is in no way limited to this embodiment.

For example, only the configuration of the engine has been illustrated in the above embodiment, but needless to say, the present invention can be applied, for example, to an engine of a hybrid vehicle equipped with an electric motor.

EXPLANATIONS OF LETTERS OR NUMERALS

10 Engine
11 Engine body
12 Cylinder head
13 Cylinder block
14 Piston
15 Connecting rod
16 Crankshaft
17 Combustion chamber
18 Intake port
19 Intake manifold
20 Intake pipe
21 Intake pressure sensor
22 Intake temperature sensor
23 Intake valve
24 Exhaust port
25 Exhaust manifold
26 Exhaust pipe
27 Exhaust valve
28 First fuel injection valve
29 Second fuel injection valve
30 Spark plug
31 Turbocharger
32 Intercooler
33 Throttle valve
34 Exhaust bypass passage
35 Waste gate valve
36 Three-way catalyst
37 $O_2$ sensor
38 Linear air-fuel ratio sensor (LAFS)
40 ECU
41 Operating state detection device
42 Fuel injection control device
43 Valve control device
44 Throttle position sensor
45 Crank angle sensor

The invention claimed is:

1. A control apparatus of an engine having
a first fuel injection valve for injecting fuel into an intake path of the engine,
a second fuel injection valve for injecting fuel into a combustion chamber of the engine,
a supercharger for supercharging intake air for the engine, and
a waste gate valve for opening and closing an exhaust bypass passage for bypassing a turbine of the supercharger,
the control apparatus comprising:
fuel injection control device that controls injection amounts of fuel injected from the first fuel injection valve and the second fuel injection valve in accordance with an operating state of the engine; and
valve control device that controls an opening/closing action of the waste gate valve, wherein the valve control device controls the waste gate valve to act in a closing direction in response to an increase in the injection amount from the first fuel injection valve, in a region where the injection amount from the first fuel injection valve is larger than the injection amount from the second fuel injection valve.

2. The control apparatus of an engine according to claim 1, wherein
the valve control device sets the waste gate valve in an open state, in a low rotation, low load operating range.

3. The control apparatus of an engine according to claim 2, wherein
the valve control device decreases an opening of the waste gate valve from the open state as the injection amount of fuel injected from the first fuel injection valve increases, in the low rotation, low load operating range.

4. The control apparatus of an engine according to claim 3, wherein
the fuel injection control device changes injection ratios of fuel injected from the first fuel injection valve and the second fuel injection valve in accordance with the operating state of the engine; and
when the operating range is switched to an operating range where the injection ratio of the second fuel injection valve is changed so as to become higher than the injection ratio of the first fuel injection valve, the valve control device closes the waste gate valve before switching of the operating range.

5. The control apparatus of an engine according to claim 4, wherein
the fuel injection control device injects fuel only from the first fuel injection valve in the low rotation, low load operating range.

6. The control apparatus of an engine according to claim 3, wherein
the fuel injection control device injects fuel only from the first fuel injection valve in the low rotation, low load operating range.

7. The control apparatus of an engine according to claim 2, wherein
the fuel injection control device injects fuel only from the first fuel injection valve in the low rotation, low load operating range.

8. The control apparatus of an engine according to claim 1, wherein
the fuel injection control device injects fuel only from the first fuel injection valve in the low rotation, low load operating range.

* * * * *